United States Patent [19]

Pask et al.

[11] 3,745,629
[45] July 17, 1973

[54] METHOD OF DETERMINING OPTIMAL SHAPES FOR STATOR BLADES

[75] Inventors: George Pask, Stanton-By-Bridge; Norman Robert Robinson, Duffield, both of England

[73] Assignee: Secretary of State for Defence, London, England

[22] Filed: Apr. 12, 1972

[21] Appl. No.: 243,223

Related U.S. Application Data

[62] Division of Ser. No. 47,514, June 18, 1970, abandoned.

[52] U.S. Cl. ........ 29/156.8 B, 29/156.8 CF, 29/404, 415/119
[51] Int. Cl. ..................... B23p 15/02, B23q 17/00
[58] Field of Search ..................... 415/119; 29/156.8 CF, 156.8 R, 156.8 B, 404

[56] References Cited
UNITED STATES PATENTS

| | | | |
|---|---|---|---|
| 3,429,023 | 2/1969 | Blythe et al. | 29/404 |
| 2,029,813 | 2/1936 | DeMey | 415/216 |
| 871,292 | 11/1907 | Parsons et al. | 415/119 UX |
| 1,062,258 | 5/1913 | Schlotter | 415/119 UX |
| 1,843,786 | 2/1932 | Robinson | 415/119 |
| 3,572,962 | 3/1971 | Embleton et al. | 415/119 |

FOREIGN PATENTS OR APPLICATIONS

| | | | |
|---|---|---|---|
| 441,269 | 1/1936 | Great Britain | 415/119 |
| 226,203 | 7/1925 | Great Britain | 415/119 |
| 630,277 | 10/1949 | Great Britain | 415/119 |
| 712,589 | 7/1954 | Great Britain | 415/119 |
| 766,812 | 1/1957 | Great Britain | 415/119 |

*Primary Examiner*—Charles W. Lanham
*Assistant Examiner*—D. G. Reiley, III
*Attorney*—Cushman, Darby & Cushman

[57] ABSTRACT

In an effort to prevent vibration-induced cracking of stator blades of the type that are secured at their radially inner and outer ends a complete stator assembly is made up and its vibration characteristics are investigated. The normal blades are then replaced by blades which are curved to the shape assumed by the normal blades in the predominant mode of vibration found by the investigation. This technique has been found to reduce vibration substantially.

4 Claims, 5 Drawing Figures

PATENTED JUL 17 1973 3,745,629
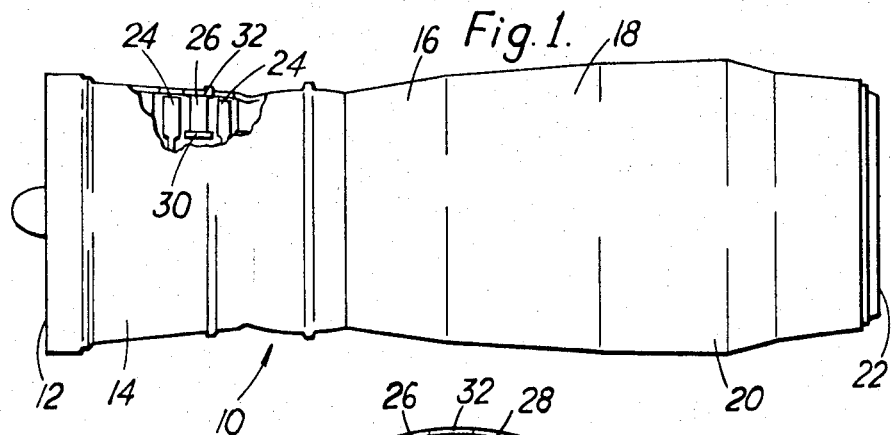
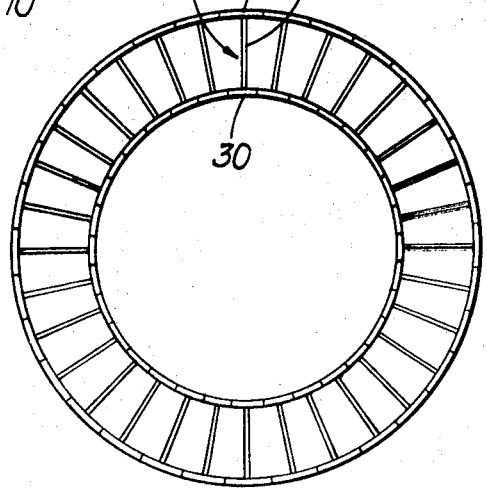
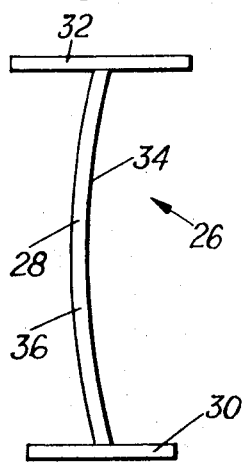 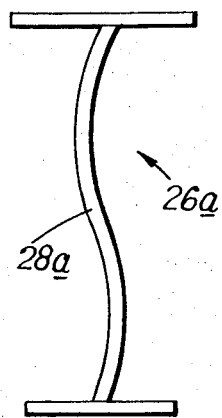 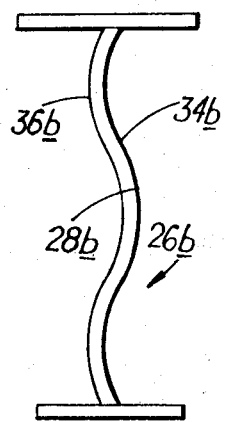
Inventor
GEORGE PASK
NORMAN ROBERT ROBINSON
By Cushman Darby Cushman
Attorneys

METHOD OF DETERMINING OPTIMAL SHAPES FOR STATOR BLADES

This is a division of application Ser. No. 47,514, filed June 18, 1970, now abandoned.

This disclosure relates to stator blades and assemblies thereof for use in fluid flow machines and is particularly but not exclusively concerned with stator blades and assemblies thereof for use in an axial flow compressor of a gas turbine engine.

In this specification the term "stator blade" is to be understood to include non-rotatable blades such as nozzle guide vanes, inlet guide vanes and the like, and streamlined struts such as are used to support in spaced relationship the walls of an annular fluid flow duct.

In use, stator blades are subjected to vibration induced, for example, by rotating parts of the fluid flow machine. This vibration can cause fatigue and lead eventually to cracking of the blades. It is an object of the present invention to alleviate this problem.

According to one aspect of the present disclosure a stator blade comprises radially inner and outer portions adapted to be secured, to,or form part of, the radially inner and outer walls respectively of an annular flow duct in a fluid flow machine and an intermediate portion connecting the radially inner and outer portions, the intermediate portion being curved to a shape similar to the shape which would be assumed by a straight, but otherwise substantially identical, blade in use when vibrating in its predominant mode of vibration.

The amplitude of the curve of the intermediate portion is preferably greater than the greatest amplitude of the curve which would be assumed by the straight, but otherwise substantially identical, blade.

The intermediate portion is preferably also shaped to exert aerodynamic forces on a fluid flowing through the fluid flow machine.

The disclosure also comprises an axial flow compressor provided with an annular array of stator blades in accordance with any of the preceding statements of invention, and a gas turbine engine provided with such a compressor.

According to a further aspect of the present disclosure, there is provided a method of manufacturing an assembly of stator blades, each of which is secured at its radially inner and outer portions, comprising the steps of producing an annular array of stator blades each having an intermediate portion which is substantially straight in a radial sense, subjecting the array to operating conditions substantially identical to its desired operating conditions, determining the predominant mode of vibration of the straight stator blades under said operating conditions and replacing the straight stator blades with stator blades each having an intermediate portion which is curved to a shape similar to the shape assumed by the straight stator blades while vibrating in their predominant mode of vibration but which is otherwise substantially identical to the intermediate portion of the straight stator blades.

The disclosure will now be described, merely by way of example, with reference to drawings accompanying the specification in which:

FIG. 1 is a diagrammatic part-sectional view of a gas turbine engine provided with a stator assembly in accordance with the present invention;

FIG. 2 is a section on the line 2-2 of FIG. 1;

FIG. 3 is an enlarged view of one of the stator blades of FIG. 2; and

FIGS. 4 and 5 are views of alternative versions of the stator blade of FIG. 3.

In FIG. 1 there is shown an aircraft gas turbine engine 10 comprising, in flow series, an air inlet 12, an axial flow compressor 14, combustion equipment 16, an axial flow turbine 18 which is drivingly connected to the compressor 14 by a shaft (not shown), a jet pipe 20 and a propulsion nozzle 22. The compressor 14 comprises alternate stages of equiangularly spaced apart rotor blades 24 and equiangularly spaced apart stator blades 26.

The stator blades 26 each have radially inner and outer portions constituted by radially inner and outer shroud members 30 and 32 respectively, joined together by intermediate portion consitituted by an aerofoil-shaped working portion 28. The shroud members 30 of adjacent blades 26 are joined together by welding or other suitable means to form a shroud ring which constitutes part of the radially inner wall of the working duct of the compressor 14, while the shroud members 32 are similarly joined to form part of the radially outer wall of the working duct (see FIG. 2). Both ends of each stator blade 26 are thus effectively secured to fixed structure. It will be appreciated, however, that other methods of securing the stator blades 26 may be employed: for example the opposite ends of 26 may be bolted or welded to, or located in slots in, the radially inner and outer walls of the working duct of the compressor 14.

In FIG. 3 there is shown an enlarged view of one of the stator blades 26, and it can be seen that the working portion 28 is curved to a shape (much exaggerated for clarity) substantially similar to the shape which would be assumed by a straight, but otherwise substantially identical, stator blade when vibrating in its first flap mode. In practice, the greatest amplitude of the curve assumed by the straight blade when vibrating is such that the curvature is not perceptible to the eye, while the curvature of the working portion 28 is greater than this and is immediately perceptible to the eye.

Since the stator blades 26 are designed to exert aerodynamic forces on the air flowing through the compressor 14, the side 34 is subjected, in use, to a higher pressure than the side 36. The working portion 28 may be curved so that the high pressure side 34 is made concave as a result of the curve. However, in some applications it may be more advantageous to make the high pressure side 34 convex as a result of the curve, the better arrangement for a particular application being determined by experiment.

The stator blades of FIG. 4 and 5 are basically similar to the stator blade 26, and similar parts will therefore be given the same reference numerals with the suffix *a* (FIG. 4) or *b* (FIG. 5). The working portion 28*a* is curved to a shape substantially similar to the shape which would be assumed by the straight stator blade when vibrating in its second flap mode, while the working portion 28*b* is curved to a shape substantially similar to the shape which would be assumed by straight stator blade when vibrating in its third flap mode. In both cases, the amplitude of the curve of the working portions 28*a*, 28*b* is greater than the greatest amplitude of the respective corresponding curve assumed by the straight blade.

The stator blade assembly of FIG. 2 is manufactured by designing a set of stator blades (not shown) for a desired application in accordance with known aerodynamic principles, the working portions of the blades being substantially straight in a radial sense. The straight blades are then assembled to form an annular array of blades similar to that shown in FIG. 2 and subjected to operating conditions substantially identical to the operating conditions of the desired application. In practice, the annular array of straight blades would be built into the compressor 14 which would then be run, either separate from or in the engine 10, under the normal operating conditions of the engine 10.

The vibration characteristics of the straight blades are then investigated while the compressor 14 is running, for example by means of strain gauges secured to the blades or by stroboscopic techniques, to determine the predominant mode of vibration of the straight blades. In the example shown in FIG. 2 it has been assumed by the predominant mode of vibration of the straight blades was the first flap mode, although the shape assumed by the straight blades when vibrating in their second and third flap modes is shown in FIGS. 4 and 5. It will be apprecitaed that it is possible for the straight blades to vibrate in more than one mode.

The straight blades are then replaced by blades each having a working portion which is precurved to the shape assumed by the straight blades when vibrating in their predominant mode of vibration but which is otherwise substantially identical to the working portion of the straight blades, i.e. the blades 26.

We have found that the curvature of the working portions 28, 28a or 28b substantially reduces the amount of vibration in the respective mode to which the blades are subjected in use. This is due to the fact that, in order to vibrate the blades 28, 28a 28b must take up positions on either side of their mean or rest position which require a greater change of blade length than is required by a straight blade when vibrating with the same amplitude.

This imposes a greater degree of constraint on the curved blades which has the effect of increasing the natural frequency of the predominant mode of vibration of the blades of a frequency above the normal excitation frequencies present when the engine 10 is operating under its normal operating conditions.

The present disclosure thus reduces blade fatigue and leads to significantly increased blade life.

It will be appreciated that the disclosure is applicable to many types of stator blades which are secured at each end, for example nozzle guide vanes, inlet guide vanes, and streamlined struts such as are used to support in spaced relationship the walls of an annular fluid flow duct.

We claim:

1. A method of manufacturing an assembly of stator blades having means securing each blade at its radially inner and outer portion, said method comprising the following steps:
   a. producing an annular array of stator blades, each blade having an intermediate portion which is substantially straight in a radial sense,
   b. subjecting said array of stator blades to operating conditions substantially identical to the desired operating conditions of said stator blades,
   c. determining the predominate mode of vibration of each of said stator blades under said operating conditions, and
   d. replacing each of said stator blades with a stator blade having an intermediate portion which is curved to a shape similar to the shape assumed by each of said straight stator blades while vibrating in its predominate mode of vibration, but which is otherwise substantially identical to said intermediate portion of a corresponding said straight stator blade.

2. A method as claimed in claim 1 including the step of replacing each of the straight stator blades with a stator blade having an intermediate portion which is curved to a shape similar to the shape which would be assumed by a straight, but otherwise substantially identical blade in use when its predominate mode of vibration is its first flap mode.

3. A method as claimed in claim 1 including the step of replacing each of the straight stator blades with a stator blade having an intermediate portion which is curved to a shape similar to the shape which would be assumed by a straight, but otherwise substantially identical blade in use when its predominate mode of vibration is is second flap mode.

4. A method as claimed in claim 1 including the step of replacing each of the straight stator blades with a stator blade having an intermediate portion which is curved to a shape similar to the shape which would be assumed by a straight, but otherwise substantially identical blade in use when its predominate mode of vibration is its third flap mode.

* * * * *